(12) United States Patent
Chang et al.

(10) Patent No.: US 10,448,381 B2
(45) Date of Patent: Oct. 15, 2019

(54) METHOD AND DEVICE FOR ENHANCING CARRIER AGGREGATION

(71) Applicant: Sharp Kabushiki Kaisha, Sakai, Osaka (JP)

(72) Inventors: Ningjuan Chang, Shanghai (CN); Qi Jiang, Shanghai (CN); Fangying Xiao, Shanghai (CN)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 181 days.

(21) Appl. No.: 15/544,241

(22) PCT Filed: Jan. 18, 2016

(86) PCT No.: PCT/CN2016/071197
§ 371 (c)(1),
(2) Date: Jul. 17, 2017

(87) PCT Pub. No.: WO2016/116021
PCT Pub. Date: Jul. 28, 2016

(65) Prior Publication Data
US 2018/0007666 A1 Jan. 4, 2018

(30) Foreign Application Priority Data

Jan. 19, 2015 (CN) .......................... 2015 1 0025688

(51) Int. Cl.
*H04W 72/04* (2009.01)
*H04L 1/18* (2006.01)
(Continued)

(52) U.S. Cl.
CPC ............. *H04W 72/042* (2013.01); *H04L 1/18* (2013.01); *H04L 5/001* (2013.01); *H04L 5/0053* (2013.01);
(Continued)

(58) Field of Classification Search
CPC ... H04W 72/042; H04W 72/04; H04W 88/08; H04W 84/045; H04W 72/0406;
(Continued)

(56) References Cited

U.S. PATENT DOCUMENTS

2013/0077514 A1* 3/2013 Dinan ................... H04L 5/0057
370/252
2013/0155898 A1* 6/2013 Yin ....................... H04L 1/0026
370/254
(Continued)

FOREIGN PATENT DOCUMENTS

CN 102164414 A 8/2011

OTHER PUBLICATIONS

Share Technote, LTE Advanced-RRC, www.sharetechnote.com, 26 pages, (Year: 2014).*

*Primary Examiner* — Mounir Moutaouakil
(74) *Attorney, Agent, or Firm* — ScienBiziP, P.C.

(57) ABSTRACT

Provided in the present invention is a method, base station, and user equipment for configuring a serving cell group. The method includes: a base station transmitting serving cell group configuration information to a user equipment having carrier aggregation capability, where the serving cell group configuration information indicates a reference cell used for transmitting uplink control information of a serving cell. The present invention allows the base station to flexibly configure multiple PUCCH reference cells and to configure different PUCCH reference cells on the basis of different cell loads.

14 Claims, 8 Drawing Sheets

(51) Int. Cl.
*H04W 74/08* (2009.01)
*H04L 5/00* (2006.01)
*H04B 7/06* (2006.01)
*H04W 84/04* (2009.01)
*H04W 88/08* (2009.01)

(52) U.S. Cl.
CPC ........... *H04L 5/0091* (2013.01); *H04W 72/04* (2013.01); *H04W 74/0833* (2013.01); *H04B 7/0623* (2013.01); *H04L 5/0035* (2013.01); *H04L 5/0057* (2013.01); *H04L 5/0098* (2013.01); *H04W 72/0406* (2013.01); *H04W 72/0413* (2013.01); *H04W 84/045* (2013.01); *H04W 88/08* (2013.01)

(58) Field of Classification Search
CPC .......... H04W 74/0833; H04W 72/0413; H04L 5/0091; H04L 5/001; H04L 5/0053; H04L 5/0098; H04L 5/0035; H04L 5/0057
See application file for complete search history.

(56) References Cited

U.S. PATENT DOCUMENTS

| | | | |
|---|---|---|---|
| 2014/0349713 A1 | 11/2014 | Yamada | |
| 2015/0078286 A1* | 3/2015 | Kim | H04L 1/18 370/329 |
| 2015/0341864 A1* | 11/2015 | Yang | H04W 52/146 455/522 |
| 2017/0373741 A1* | 12/2017 | Yang | H04L 1/18 |
| 2018/0048429 A1* | 2/2018 | Takahashi | H04L 1/1812 |
| 2019/0014601 A1* | 1/2019 | Kim | H04L 1/18 |
| 2019/0098623 A1* | 3/2019 | Van Der Velde | H04W 76/10 |

* cited by examiner

METHOD AND DEVICE FOR ENHANCING CARRIER AGGREGATION

TECHNICAL FIELD

The present invention relates to the technical field of radio communication. More specifically, the present invention relates to a resource configuration method for communication between devices, a base station and a user equipment.

BACKGROUND

With the development of mobile communication and the diversification of services, increasingly higher requirements are put forward on the transmission rate of communication systems. Carrier aggregation (CA) technology has been introduced into 3GPP Release 10 and Release 11, and is used to increase the downlink and uplink speeds of a system. That is, a user equipment (UE) can be configured with multiple carriers at the same time, and can simultaneously perform transmission and reception on these multiple carriers, which, compared with prior single-carrier transmission, greatly increases transmission speed and resource utilization rate.

In 3GPP Release 10 and Release 11, a serving base station (eNB) configures multiple carriers for the user equipment, and these carriers belong to the same base station. A cell which corresponds to the primary component carrier (PCC) of the serving base station is called a primary cell (PCell), and the primary component carrier provides radio resource control connection between the UE and the eNB and a transmission resource. A cell which corresponds to the secondary component carrier (SCC) of the serving base station is called a secondary cell (SCell), and the secondary cell is mainly used to provide a transmission resource. A PCell and one or more SCells are included in serving cells corresponding to the multiple carriers configured for the UE. In the R10/11 version of protocol, the UE can, at most, support eight serving cells at the same time.

In the R10/11 version of CA, only the configuration of physical uplink control channels (PUCCH) on the PCells is supported. That is, for a UE, configured SCells thereof do not have PUCCHs. Uplink control information (UCI) which is needed to optimize downlink transmission, such as a channel quality indicator, and hybrid automatic repeat request feedback (HARQ), needs to be transmitted via a PUCCH. In this case, the UCI corresponding to all the SCells needs to be carried by the PUCCH of the PCell.

The dual connectivity (DC) technology is introduced into 3GPP Release 12 to increase user throughput and improve mobility performance. When DC is configured, the UE can simultaneously communicate with two eNBs, each base station can maintain cell configuration similar to R10/R11 CA, and are divided into a master base station (Master eNB) and a secondary base station (Secondary eNB). In this case, for a UE, the MeNB can include a PCell and one or more SCell; and the SeNB can include a primary secondary cell (PSCell) and one or more SCells. PUCCHs can be configured on the PCell and the PSCell. Just as in CA, UCI of the PCell and SCells included in all the serving cells belonging to the MeNB is carried on the PUCCH of the PCell, and UCI of the PSCell and SCells included in all the serving cells belonging to the SeNB is carried on the PUCCH of the PSCell.

In ongoing Release 13, the enhanced CA technology (eCA) is being discussed. In eCA, PUCCHs on SCells are introduced, and moreover, the number of carriers capable of being simultaneously supported by a UE is increased to 32, so that the system resource utilization rate can be increased. However, adopting the PUCCH of a PCell or an SCell to carry the UCI of an SCell and adopting the PUCCH of which SCell to carry the UCI under SCell PUCCH configuration is an urgent problem that needs to be solved.

SUMMARY

According to a first aspect of the present invention, provided is a method executed by a base station, where the base station communicates with a user equipment, the user equipment is configured with multiple carriers corresponding to multiple serving cells, the multiple serving cells include a primary cell and one or more secondary cells, and the method includes: transmitting a configuration message to the user equipment, where the configuration message includes physical uplink control channel (PUCCH) reference cell configuration information of the serving cells, and reference cells include a primary cell and/or secondary cells configured with PUCCHs; and receiving uplink control information of the serving cells on the corresponding PUCCHs according to the PUCCH reference cell configuration information of the serving cells.

In one embodiment, if the serving cells themselves are the reference cells, the uplink control information of the serving cells is received on the PUCCHs of the serving cells. Alternatively, if the serving cells are configured with reference cells, the uplink control information of the serving cells is received on the PUCCHs of the reference cells.

In one embodiment, if the serving cells are neither the reference cells nor configured with the reference cells, the uplink control information of the serving cells is received on the PUCCH of the primary cell.

In one embodiment, the uplink control information includes one or more of the following: a channel quality indicator, a precoding matrix index, a rank indicator, a precoding type indicator, and hybrid automatic repeat request feedback.

In one embodiment, the primary cell and the secondary cells belong to the same base station. Alternatively, the secondary cells and the reference cells corresponding thereto belong to the same base station.

In one embodiment, the PUCCH reference cell configuration information of the serving cells is included in a radio resource control (RRC) message.

According to a second aspect of the present invention, provided is a method executed by a user equipment, where the user equipment communicates with a base station, the user equipment is configured with multiple carriers corresponding to multiple serving cells, the multiple serving cells include a primary cell and one or more secondary cells, and the method includes: receiving a configuration message from the base station, where the configuration message includes physical uplink control channel (PUCCH) reference cell configuration information of the serving cells, and reference cells include a primary cell and/or secondary cells configured with PUCCHs; and transmitting uplink control information of the serving cells on the corresponding PUCCHs according to the PUCCH reference cell configuration information of the serving cells.

In one embodiment, if the serving cells themselves are the reference cells, the uplink control information of the serving cells is transmitted on the PUCCHs of the serving cells. Alternatively, if the serving cells are configured with reference cells, the uplink control information of the serving cells is transmitted on the PUCCHs of the reference cells.

In one embodiment, if the serving cells are neither the reference cells nor configured with the reference cells, the uplink control information of the serving cells is transmitted on the PUCCH of the primary cell.

In one embodiment, the uplink control information includes one or more of the following: a channel quality indicator, a precoding matrix index, a rank indicator, a precoding type indicator, and hybrid automatic repeat request feedback.

In one embodiment, the primary cell and the secondary cells belong to the same base station. Alternatively, the secondary cells and the reference cells corresponding thereto belong to the same base station.

In one embodiment, the PUCCH reference cell configuration information of the serving cells is included in a radio resource control (RRC) message.

According to a third aspect of the present invention, provided is a base station, where the base station communicates with a user equipment, the user equipment is configured with multiple carriers corresponding to multiple serving cells, the multiple serving cells include a primary cell and one or more secondary cells, and the base station includes: a transmission unit configured to transmit a configuration message to the user equipment, where the configuration message includes physical uplink control channel (PUCCH) reference cell configuration information of the serving cells, and reference cells include a primary cell and/or secondary cells configured with PUCCHs; and a receiving unit configured to receive uplink control information of the serving cells on the corresponding PUCCHs according to the PUCCH reference cell configuration information of the serving cells.

In one embodiment, if the serving cells themselves are the reference cells, the receiving unit receives the uplink control information of the serving cells on the PUCCHs of the serving cells. Alternatively, if the serving cells are configured with reference cells, the receiving unit receives the uplink control information of the serving cells on the PUCCHs of the reference cells.

In one embodiment, if the serving cells are neither the reference cells nor configured with the reference cells, the receiving unit receives the uplink control information of the serving cells on the PUCCH of the primary cell.

In one embodiment, the uplink control information includes one or more of the following: a channel quality indicator, a precoding matrix index, a rank indicator, a precoding type indicator, and hybrid automatic repeat request feedback.

In one embodiment, the primary cell and the secondary cells belong to the same base station. Alternatively, the secondary cells and the reference cells corresponding thereto belong to the same base station.

In one embodiment, the PUCCH reference cell configuration information of the serving cells is included in a radio resource control (RRC) message.

According to a fourth aspect of the present invention, provided is a user equipment, where the user equipment communicates with a base station, the user equipment is configured with multiple carriers corresponding to multiple serving cells, the multiple serving cells include a primary cell and one or more secondary cells, and the user equipment includes: a receiving unit configured to receive a configuration message from the base station, where the configuration message includes physical uplink control channel (PUCCH) reference cell configuration information of the serving cells, and reference cells include a primary cell and/or secondary cells configured with PUCCHs; and a transmission unit configured to transmit uplink control information of the serving cells on the corresponding PUCCHs according to the PUCCH reference cell configuration information of the serving cells.

In one embodiment, if the serving cells themselves are the reference cells, the transmission unit transmits the uplink control information of the serving cells on the PUCCHs of the serving cells. Alternatively, if the serving cells are configured with reference cells, the transmission unit transmits the uplink control information of the serving cells on the PUCCHs of the reference cells.

In one embodiment, if the serving cells are neither the reference cells nor configured with the reference cells, the transmission unit transmits the uplink control information of the serving cells on the PUCCH of the primary cell.

In one embodiment, the uplink control information includes one or more of the following: a channel quality indicator, a precoding matrix index, a rank indicator, a precoding type indicator and hybrid automatic repeat request feedback.

In one embodiment, the primary cell and the secondary cells belong to the same base station. Alternatively, the secondary cells and the reference cells corresponding thereto belong to the same base station.

In one embodiment, the PUCCH reference cell configuration information of the serving cells is included in a radio resource control (RRC) message.

The present invention allows the base station to flexibly configure multiple PUCCH reference cells, configure different PUCCH reference cells according to different cell loads, and choose suitable PUCCH reference cells for serving cells to perform corresponding UCI transmission. By means of the present invention, the user equipment can carry out UCI transmission on corresponding PUCCHs according to the configuration of the base station, so that load balance between the multiple PUCCHs is realized in UCI transmission.

BRIEF DESCRIPTION OF THE DRAWINGS

The multiple aspects of the present invention can be better understood in reference to the following drawings. Parts in the drawings are not drawn proportionally, but are only intended to show the principle of the present invention. In order to conveniently show and describe some parts of the present invention, corresponding portions in the drawings may be magnified or minimized.

Elements and features described in one drawing or embodiment of the present invention can be combined with elements and features shown in one or more other drawings or embodiments. In addition, in the drawings, similar callouts represent the corresponding parts in the multiple drawings, and can be used to indicate the corresponding parts used in more than one embodiment.

DETAILED DESCRIPTION OF THE INVENTION

Figure 1:
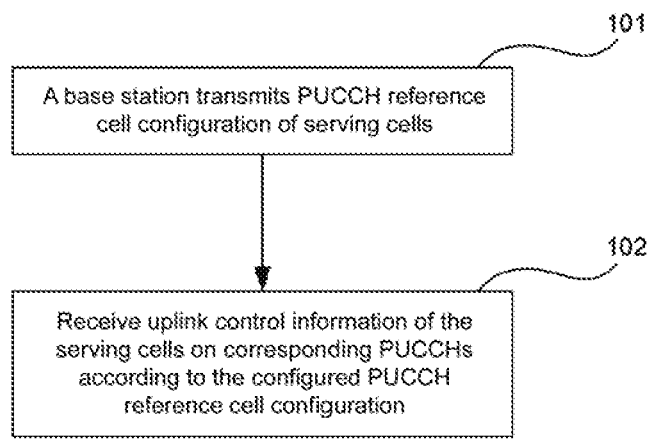
FIG. 1 is a flowchart of a method executed by a base station according to one embodiment of the present invention.

By referring to the drawings, by means of the specification below, the foregoing and other features of the present invention will become clear. In the specification and the drawings, specific embodiments of the present invention are disclosed particularly, and indicates parts of the embodiments of the principle of the present invention that can be adopted. It should be known that the present invention is not limited to the described embodiments, and on the contrary, the present invention includes all modifications, variations and equivalents which fall within the coverage of the attached claims. In addition, for the sake of simplicity and convenience, the detailed description of the conventional technology without direct association with the present invention is omitted in order to prevent the understanding of the present invention from being confused.

The present invention is not limited to eCA systems of R13, and is also applicable to other devices and systems adopting the multi-carrier technology, such as a DC+eCA system.

In reference to the drawings and the specific embodiments, the following describes cell grouping in an enhanced CA scenario which is put forward by the present invention. Specifically, with an LTE mobile communication system and subsequent evolved version thereof as an exemplary application environment and R13 eCA as an implementing technology scenario (that is, a UE which supports CA works under an eNB, PUCCHs of SCells can be configured, and optionally, 32 carriers can be supported as well), multiple embodiments based on the present invention are described hereinafter. However, it needs to be indicated that the present invention is not limited to the following embodiments, but is applicable to other radio communication systems, such as the future 5G cellular communication system.

In the present invention, UCI can include one or more or any combination of a channel quality indicator (CQI), a precoding matrix index (PMI), a rank indicator (RI), a precoding type indicator (PTI), and an HARQ feedback indicator.

Embodiment 1

FIG. 1 is a flowchart of a method executed by a base station according to one embodiment of the present invention.

Step 101: The base station transmits a configuration message, where PUCCH reference cell configuration information of serving cells is included. For example, the base station can transmit the PUCCH reference cell configuration information of a serving cell when the serving cell is added or the serving cell is modified. The PUCCH reference cell configuration information can indicate which PUCCH cell that is used by a serving cell to transmit UCI. The implementation method of PUCCH reference cells in the 3GPP standard protocol can be seen in examples given by Embodiments 4 to 7 below, but is not limited to these embodiments.

Step 102: The base station receives uplink control information (UCI) of the serving cell on the corresponding PUCCH according to the configured PUCCH reference cell configuration information of the serving cell.

An example of a cell grouping method based on PUCCH reference cells is illustrated below. It is assumed that an eNB configures nine serving cells for a UE, which include a PCell and eight SCells (SCells 1 to 8), where the PCell, the SCell 3 and the SCell 6 are configured with PUCCHs. In this case, the eNB can configure PUCCH reference cells of the SCell 1 and the SCell 2 as the PCell, reference cells of the SCell 4 and the SCell 5 (and the SCell 3) as the SCell 3, and reference cells of the SCell 7 and the SCell 8 (and the SCell 6) as the SCell 6. Cell grouping is performed by this configuration method, that is, the PCell and the SCells 1/2 serve as a cell group, the SCells 3/4/5 serve as a cell group, and the SCells 6/7/8 serve as a cell group. In a cell group, the UCI of each serving cell is transmitted on the PUCCH of the PUCCH reference cell.

Alternatively, before Step 101, the method may further include: the base station receives and acquires capability information about whether the UE supports the PUCCH on SCell, the information can be transmitted via an RRC (Radio Resource Control) message, for example, the information can be located in a UE-EUTRA-Capability information element in UECapabilityInformation. Here, the SCells do not include a PSCell in DC. An exemplary implementation method for UE capability information in the 3GPP standard protocol is given below:

```
UE-EUTRA-Capability-v13xy-IEs ::= SEQUENCE {
    phyLayerParameters-v13xy         PhyLayerParameters-v13xy  OPTIONAL,
...
    nonCriticalExtension             SEQUENCE {}               OPTIONAL
}
phyLayerParameters-v13xy ::=         SEQUENCE {
    SCellPUCCH-v13xy                 ENUMERATED {supported}    OPTIONAL,
...
}
```

Figure 2:
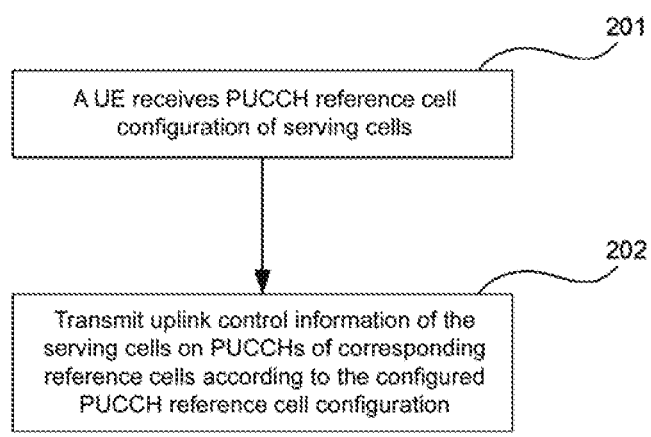
FIG. 2 is a flowchart of a method executed by a UE according to one embodiment of the present invention.

FIG. 2 is a flowchart of a method executed by a UE according to one embodiment of the present invention.

Step 201: The UE receives a configuration message, where PUCCH reference cell configuration information of serving cells is included. In the present embodiment, the UE can receive the PUCCH reference cell configuration information of a serving cell when the serving cell is added or the serving cell is modified. The PUCCH reference cell configuration information can indicate which PUCCH cell that is used by the serving cell to transmit UCI. The implementation method of PUCCH reference cells in the 3GPP standard protocol can be seen in the examples given by Embodiments 4 to 7 below, but is not limited to these embodiments.

Step 202: The UE transmits uplink control information (UCI) of the serving cell on the corresponding PUCCH according to the configured PUCCH reference cell configuration information of the serving cell. The specific process will be introduced in detail in Embodiments 4 to 7, but is not limited to these embodiments. Preferably, before Step 201, the method may further include: the UE transmits capability information about whether it supports the PUCCH on SCell to an eNB, as mentioned above.

Figure 3:
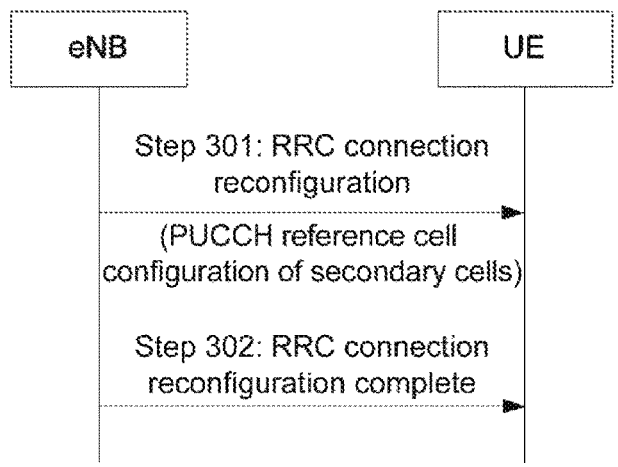
FIG. 3 is a flowchart of an information interaction between a base station and a UE according to one embodiment of the present invention.

FIG. 3 is a flowchart of an information interaction between a base station and a UE according to one embodiment of the present invention.

Step 301: The eNB transmits a configuration message to the UE, where PUCCH reference cell configuration information of serving cells is included. The PUCCH reference cell configuration information can indicate which PUCCH cell s that is used by a serving cell to transmit UCI.

For example, the information can be transmitted via an RRC message (such as an RRC connection reconfiguration message). Specifically, the PUCCH reference cell configuration information of a serving cell can be transmitted when secondary cell is added or the secondary cell is modified.

Step 302: The UE receives the PUCCH reference cell configuration information of the serving cells transmitted by the eNB, and returning a response message to the eNB. For example, the response message can be an RRC connection reconfiguration completion message.

Preferably, before Step 301, the method may further include: the UE and the eNB interact with each other for capability information about whether the UE supports the PUCCH on SCell.

Embodiment 2

Figure 4:
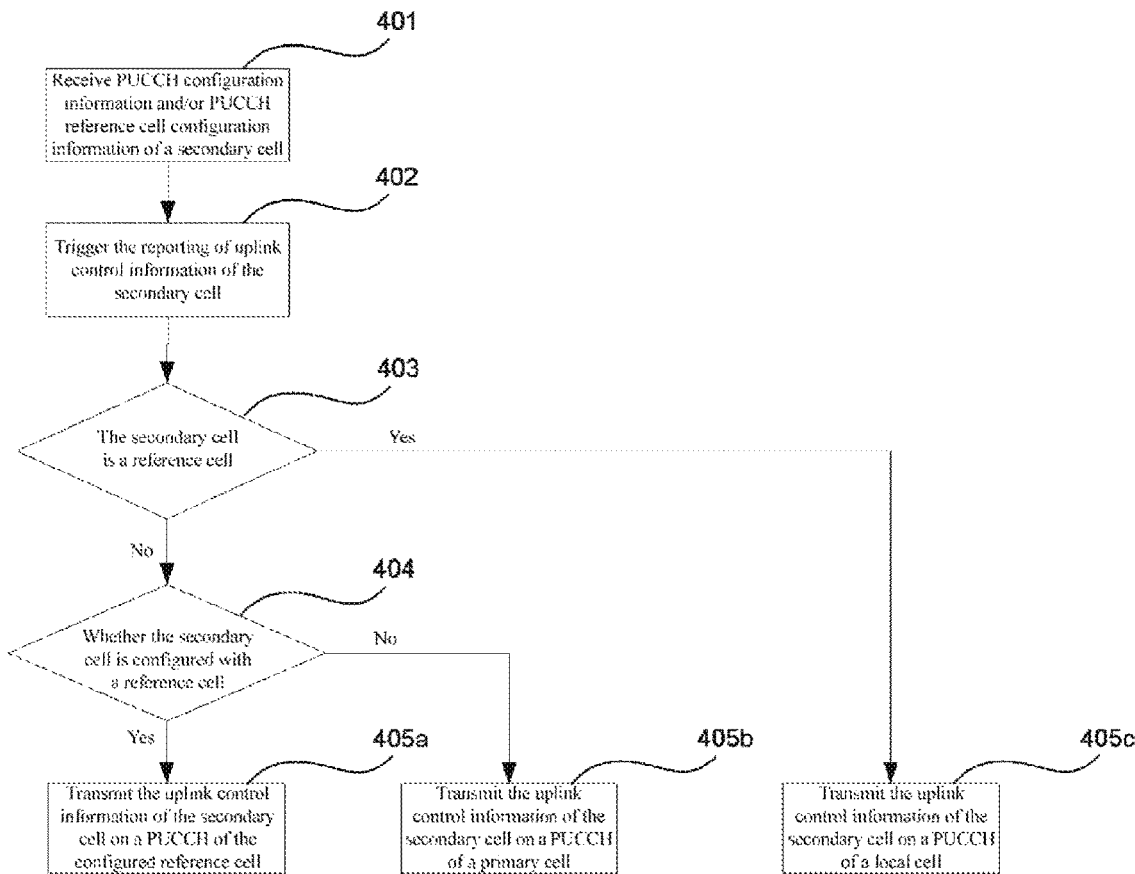
FIG. 4 is a flowchart of a method executed by a UE according to one embodiment of the present invention.

FIG. 4 is a flowchart of a method executed by a UE according to one embodiment of the present invention. The present embodiment provides a method for a UE to transmit UCI of a serving cell on PUCCH channel of corresponding reference cell according to PUCCH reference cell configuration information of the serving cell configured by an eNB. In the present embodiment, the serving cells mean SCells.

Step 401: The UE receives PUCCH configuration information and/or PUCCH reference cell configuration information of the SCells. The PUCCH configuration information of a SCell indicates that the SCell is configured with PUCCH; and the PUCCH reference cell configuration information of a SCell is described as above.

Step 402: The UE triggers the reporting of UCI of one or more SCells.

Step 403: The UE determines whether the SCell is a reference cell. If so, then execute Step 405c, or else execute Step 404. Specifically, in this step, the UE can determine whether the SCell is a reference cell by the following method: if the SCell is configured with PUCCH and/or the PUCCH reference cell of the SCell is configured as own, then the SCell is regarded as a PUCCH reference cell.

Step 404: The UE determines whether the SCell is configured with a reference cell. If so, then execute Step 405a, or else execute Step 405b.

Step 405a: The UE transmits the UCI of the SCell on the PUCCH of the configured reference cell.

Step 405b: The UE transmits the UCI of the SCell on the PUCCH of a PCell.

Step 405c: The UE transmits the UCI of the SCell on the PUCCH of the SCell.

Among the above-mentioned steps, when the reference cell content of the SCell can be configured as a PCell or an SCell, Step 404 can be omitted. That is, if the result of executing Step 403 is No, then jump to Step 405a. Naturally, Step 405b can also be omitted, because Step 405a and Step 405b can represent the same content at this point.

Embodiment 3

Figure 5:
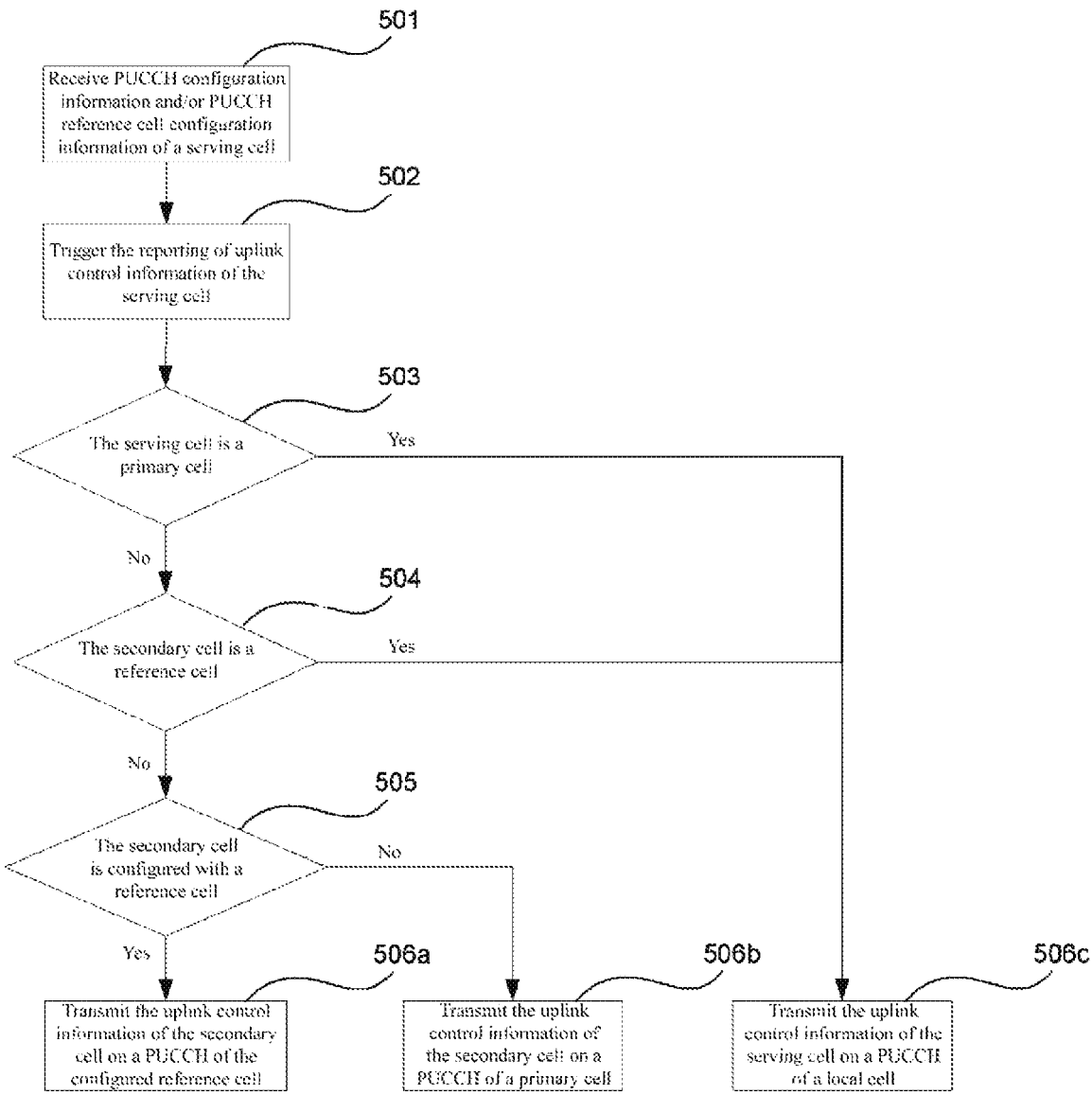
FIG. 5 is a flowchart of a method executed by a UE according to one embodiment of the present invention.

FIG. 5 is a flowchart of a method executed by a UE according to one embodiment of the present invention. The present embodiment provides a method for a UE to transmit UCI of a serving cell on PUCCH of the corresponding reference cell according to PUCCH reference cell configuration information of the serving cell configured by an eNB. In the present embodiment, a serving cell can be a PCell or an SCell, that is, comprised with Embodiment 2, the present embodiment adds a step for determining whether a serving cell is a PCell.

Step 501: The UE receives PUCCH configuration information and/or PUCCH reference cell configuration information of a serving cell. The PUCCH configuration information of the serving cell indicates that the serving cell is configured with PUCCH; and the PUCCH reference cell configuration information of a serving cell is described as above.

Step 502: The UE triggers the reporting of UCI of one or more serving cells.

Step 503: The UE determines whether the serving cell is a PCell, if so, then execute Step 506c, or else execute Step 504.

Step 504: The UE determines whether the SCell is a reference cell. If so, then execute Step 506c, or else execute Step 505. In this step, the UE can determine whether the SCell is a reference cell by the following method: if the SCell is configured with PUCCH and/or the PUCCH reference cell of the SCell is configured as own, then the SCell is regarded as a PUCCH reference cell.

Step 505: The UE determines whether the SCell is configured with a reference cell. If so, then execute Step 506a, or else execute Step 506b.

Step 506a: The UE transmits the UCI of the SCell on the PUCCH of the configured reference cell.

Step 506b: The UE transmits the UCI of the SCell on the PUCCH of a PCell.

Step 506c: The UE transmits the UCI of the serving cell on the PUCCH of this serving cell.

Among the above-mentioned steps, when the reference cell content of the SCell can be configured as the PCell or the SCell, Step 505 can be omitted. That is, if the result of executing Step 504 is No, then jump to Step 506a. Naturally, Step 506b can also be omitted, because Step 506a and Step 506b can represent the same content at this point.

General processing flows of the UE performing UCI transmission according to the PUCCH reference cell in the present invention are given in above-mentioned Embodiments 2 and 3. Several types of specific information element implementation methods for PUCCH reference cell configuration information in the 3GPP standard protocol are given in Embodiments 4 to 7 below. In combination with these several types of information element representation methods, Embodiments 4 to 7 describe the general methods given in Embodiments 2 and 3 in more detail.

Embodiment 4

The present embodiment provides a method for a UE to transmit UCI of a serving cell on PUCCH of the corresponding reference cell according to PUCCH reference cell configuration information of the serving cell configured by an eNB.

In the present embodiment, a method for configuring PUCCH reference cell configuration information of a serving cell is as follows:

```
RadioResourceConfigCommonSCell-r10 ::= SEQUENCE {
    ...,
    -OMIT THE UNCHANGE PART
    ...,
[[
    pucch-ConfigCommon-r13        PUCCH-ConfigCommon,    OPTIONAL -- Need OP
]],
}
}
PhysicalConfigDedicatedSCell-r10 ::=    SEQUENCE {
    ...,
    -OMIT THE UNCHANGE PART
    ...,
    [[
    PUCCHreference-Config-r13              OPTIONAL -- Need OP
    ]],
PUCCHreference-Config-r13 ::=          SEQUENCE {
    PUCCHreferenceCellInfo-r10         CHOICE {
        own-r13            SEQUENCE {  -- No cross PUCCH scheduling
},
        other-r13          SEQUENCE {       -- Cross PUCCH scheduling
            referenceCellId-r13       ServCellIndex-r13,
        }
    }
}
}
```

PUCCHs of serving cells or SCells can be configured through PUCCH-ConfigCommon information elements, and PUCCH reference cell configuration information of the serving cells or SCells can be configured through PUCCHreference-config information elements. SerCellIndex-13 can be used to mark a secondary cell, but it can be replaced by other forms of cell identities for representing a secondary cell.

Figure 6:
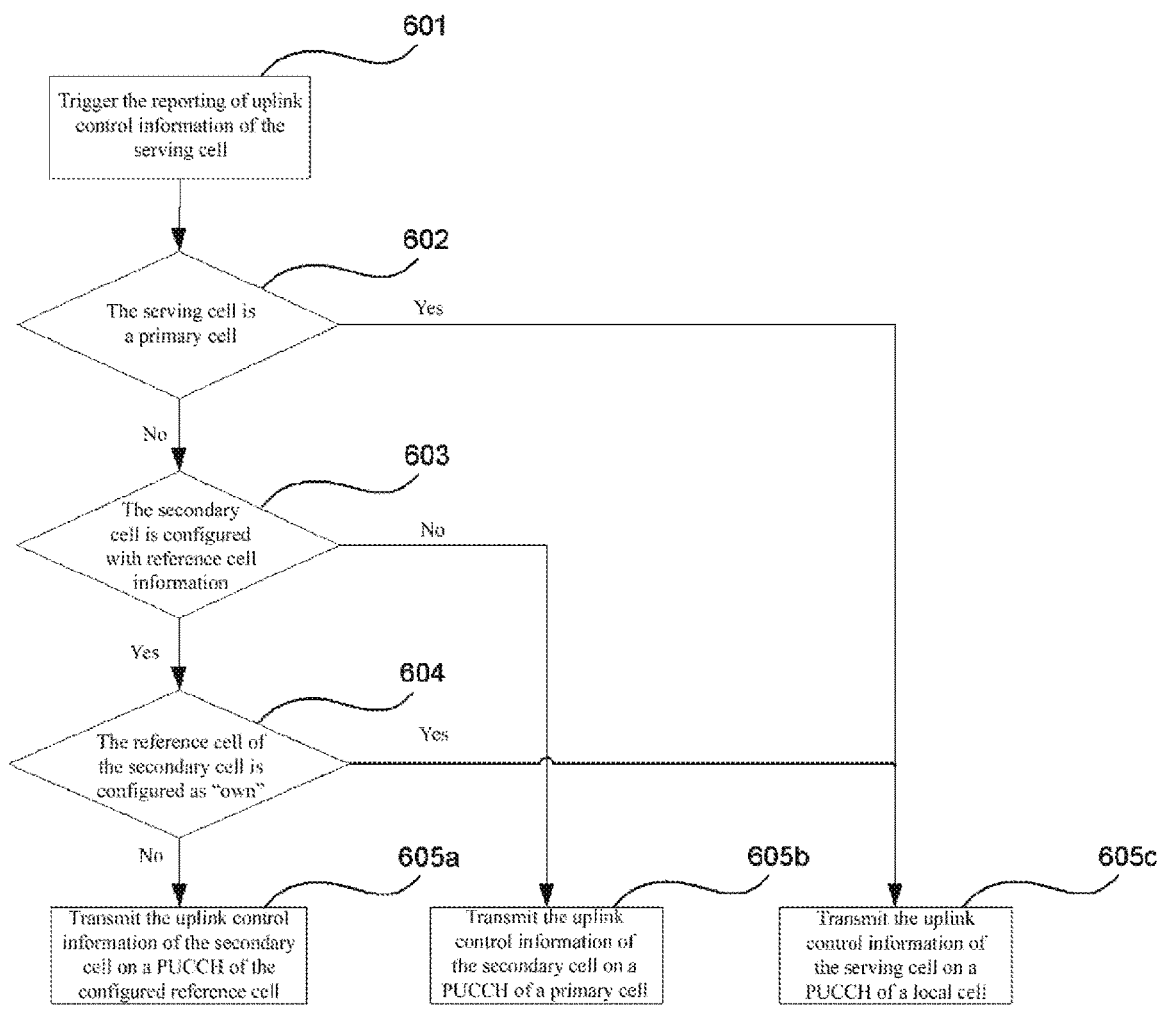
FIG. 6 is a flowchart of a method executed by a UE according to one embodiment of the present invention.

FIG. 6 is a flowchart of a method executed by a UE according to one embodiment of the present invention.

Step 601: The UE triggers the reporting of UCI of one or more serving cells.

Step 602: The UE determines whether the serving cell is a PCell. If so, then execute Step 605c, or else execute Step 603.

Step 603: The UE determines whether the SCell is configured with reference cell information. If so, then execute Step 604, or else execute Step 605b.

Step 604: The UE determines whether the reference cell configuration of the SCell is "own". If so, then the cell is a PUCCH reference cell and execute Step 605c, or else execute Step 605a.

Step 605a: The UE transmits the UCI of the SCell on the PUCCH of a configured reference cell. Step 605b: The UE transmits the UCI of the SCell on the PUCCH of a PCell.

Step 605c: The UE transmits the UCI of the serving cell on the PUCCH of this serving cell.

Among the above-mentioned steps, Step 602 is optional. That is, the UE can transmit UCI of the PCell on the PUCCH of the PCell by default without carrying out determination, and after the UE triggers the reporting of the UCI of the SCell in Step 601, Step 603 is executed directly.

In addition, when the content of refrenceCellId-r13 can be set as a PCell or an SCell, Step 603 can be omitted. Naturally, Step 605b can also be omitted, because Step 605b and Step 605a can represent the same content at this point.

In addition, the case that the content of refrenceCellId-r13 can be set as a PCell or an SCell includes the following two types: (1) refrenceCellId-r13 can be used to mark a serving cell (not only a PCell but also an SCell can be marked), for example, a PCell is marked when SerCellIndex is 0, and an SCell is marked when SerCellIndex is 1 to m (m is a natural number); (2) in the information element of the present embodiment, referenceCellId-r13 can also be the following form:

```
other-r13              SEQUENCE {  --Cross PUCCH scheduling
    referenceCellId-r13          CHOICE{
        SCellIndex,
        PCell
        }
}
```

SCellIndex is used to mark a secondary cell, and it can be replaced by other forms of cell identities for representing a secondary cell.

Embodiment 5

The present embodiment provides a method for a UE to transmit UCI of a serving cell on PUCCH of the corresponding reference cell according to PUCCH reference cell configuration information of the serving cell configured by an eNB.

In the present embodiment, a method for configuring PUCCH reference cell configuration information of a serving cell is as follows:

```
--Multipul MSCells can be configured which is different from only one PSCell
MSCellToAddModList-r13 ::=            SEQUENCE (SIZE (1..maxMCell-r13) OF MSCellToAddMod-r13
MSCellToAddMod-r13 ::=                SEQUENCE {
    sCellIndex-r13                        SCellIndex-r13,
    cellIdentification-r13                SEQUENCE {
        physCellId-r13                        PhysCellId,
        dl-CarrierFreq-r13                    ARFCN-ValueEUTRA
    }                                     OPTIONAL, -- Cond SCellAdd
    radioResourceConfigCommonMSCell-r13   RadioResourceConfigCommonMSCell-r13 OPTIONAL, -- Cond SCellAdd
    radioResourceConfigDedicatedMSCell-r13 RadioResourceConfigDedicatedMSCell-r13 OPTIONAL, -- Cond
SCellAdd2
    ...,
    [[ dl-CarrierFreq-v1090               ARFCN-ValueEUTRA-v9e0 OPTIONAL -- Cond EAFRCN-max
    ]]
},
-- Similar functionality as PSCell to support PUCCH,
RadioResourceConfigCommonMSCell-r13 ::= SEQUENCE {
    basicFields-r13                       RadioResourceConfigCommonSCell-r10,
    pucch-ConfigCommon-r13                PUCCH-ConfigCommon,
    ...
},
--Need to configure the grouping SCell list for PUCCH transmission
RadioResourceConfigDedicatedMSCell-r13 ::= SEQUENCE {
    -- UE specific configuration extensions applicable for an MSCell
    physicalConfigDedicatedMSCell-r13     PhysicalConfigDedicated            OPTIONAL, -- Need ON
    SCellToAddModMSCellList-r13  ...      OPTIONAL, -- Need ON
}
SCellToAddModMSCellList-r13 ::= SEQUENCE (SIZE (1..maxSCell-r13)) OF SCellToAddModMSCell-r13
SCellToAddModMSCell -r13 ::= SEQUENCE {
    sCellIndex-r13                        SCellIndex-r13,
    ...
}
```

PUCCHs of serving cells or SCells can be configured through PUCCH-ConfigCommon information elements, PUCCH reference cell configuration information of the serving cells or SCells can be configured through MSCell-ToAddMod information elements, and here, MSCell is used to represent a reference cell. In addition, SCellIdex is used to mark a secondary cell, and of course, it can be replaced by other cell identities for representing the secondary cell.

Figure 7:
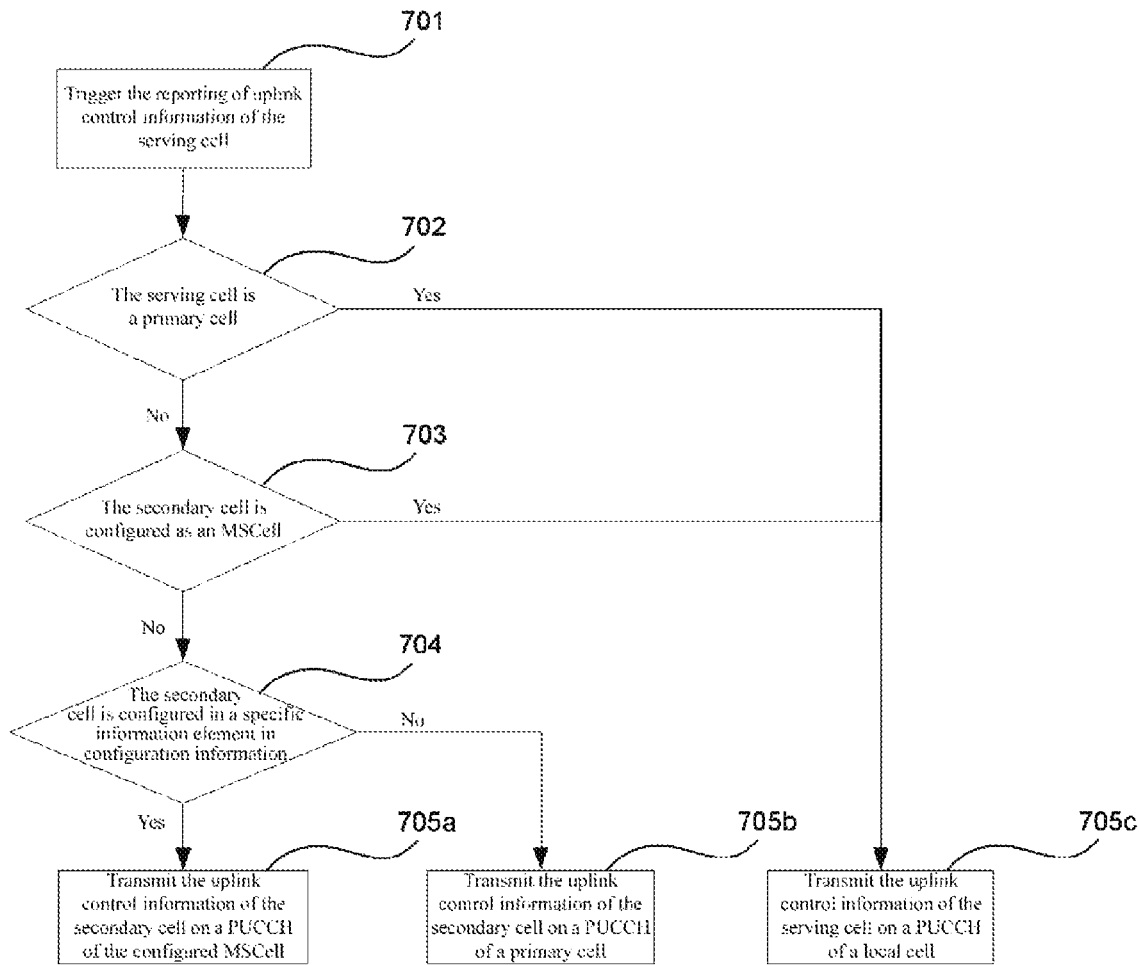
FIG. 7 is a flowchart of a method executed by a UE according to one embodiment of the present invention.

FIG. 7 is a flowchart of a method executed by a UE according to one embodiment of the present invention.

Step 701: The UE triggers the reporting of UCI of one or more serving cells.

Step 702: The UE determines whether the serving cell is a PCell. If so, then execute Step 705c, or else execute Step 703.

Step 703: The UE determines whether the SCell is configured as an MSCell. If so, then execute Step 705c, or else execute Step 704.

Step 704: The UE determines whether the SCell is configured in a scellToAddModMScellList in MSCell configuration information. If so, then execute Step 705a, or else execute Step 705b.

Step 705a: The UE transmits the UCI of the SCell on the PUCCH of the configured reference cell. Step 705b: The UE transmits the UCI of the SCell on the PUCCH of a PCell.

Step 705c: The UE transmits the UCI of the serving cell the PUCCH of this serving cell.

Among the above-mentioned steps, Step 702 is optional. That is, the UE can transmit UCI of the PCell on the PUCCH of the PCell by default without carrying out determination. After the UE triggers the reporting of the UCI of the SCell in Step 701, Step 703 is executed directly.

Embodiment 6

The present embodiment provides a method for a UE to transmit UCI of a serving cell on PUCCH of the corresponding reference cell according to PUCCH reference cell configuration information of the serving cell configured by an eNB.

In the present embodiment, a method for configuring PUCCH reference cell configuration information of a serving cell is as follows:

```
RadioResourceConfigCommonSCell-r10 ::= SEQUENCE {
    ...,
    OMIT THE UNCHANGE PART
    ...,
    [[
        pucch-ConfigCommon-r13   PUCCH-ConfigCommon,   OPTIONAL -- Need OP
    ]]
}
}
PhysicalConfigDedicatedSCell-r13 ::=    SEQUENCE {
        PUCCHassociation-r13   PUCCHAssociation-r13 OPTIONAL, -- Need ON
        ...,
}                                                             OPTIONAL,
PUCCHAssociation-r13 ::=   SEQUENCE {
        PUCCHAssociation-r13    ServCellIndex-r13,
        ...,
}
```

PUCCHs of serving cells or SCells can be configured through PUCCH-ConfigCommon information elements, and PUCCH reference cell configuration information of the serving cells or SCells can be configured through PUCCH association information elements. In addition, SerCellIndex can be used to mark a secondary cell, and it can be replaced by other forms of cell identities for representing a secondary cell.

Figure 8:
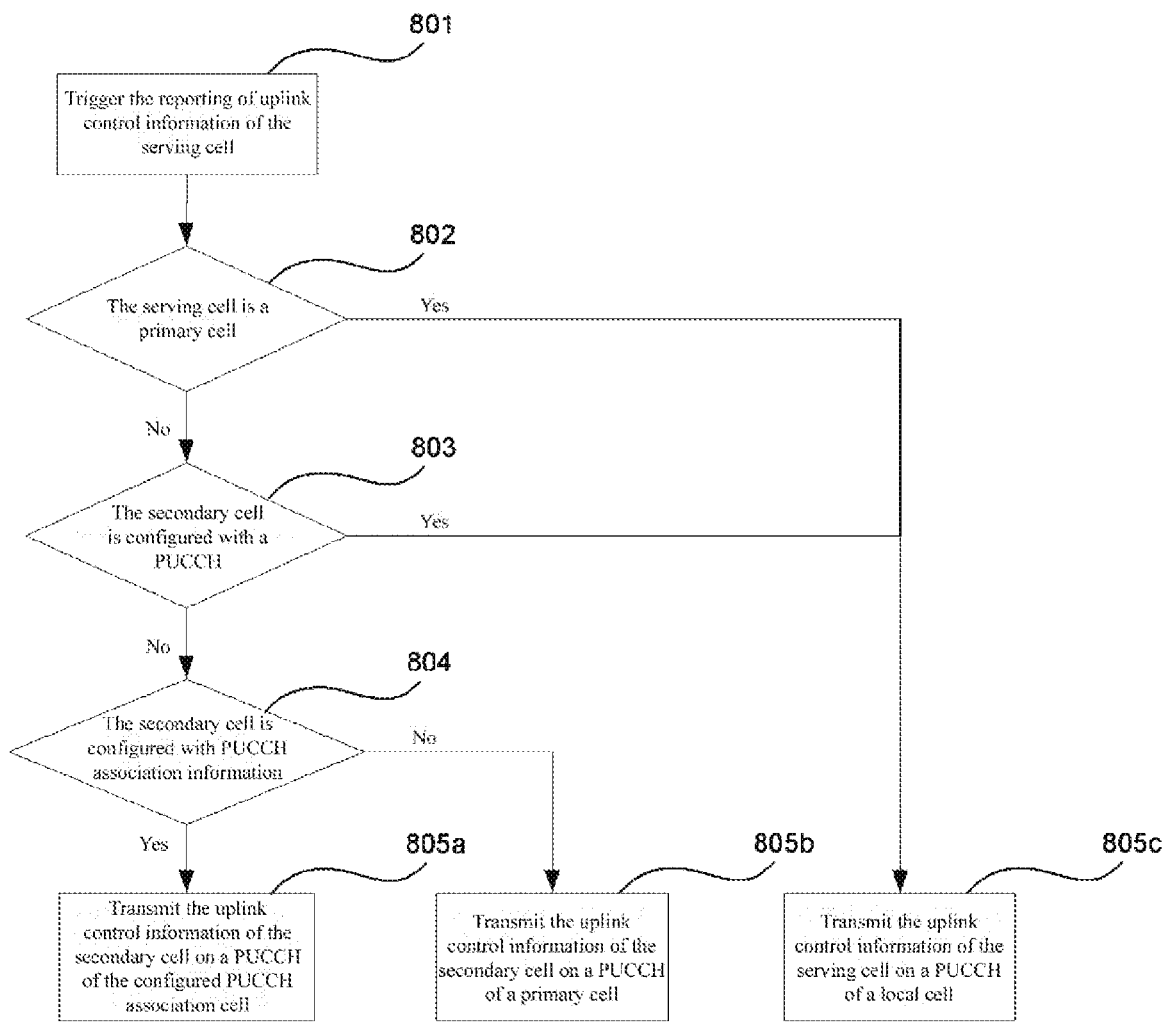
FIG. 8 is a flowchart of a method executed by a UE according to one embodiment of the present invention.

FIG. 8 is a flowchart of a method executed by a UE according to one embodiment of the present invention.

Step 801: The UE triggers the reporting of UCI of one or more serving cells.

Step 802: The UE determines whether the serving cell is a PCell. If so, then execute Step 805c, or else execute Step 803.

Step 803: The UE determines whether the SCell is configured with a PUCCH. If so, then execute Step 805c, or else execute Step 804.

Step 804: The UE determines whether the SCell is configured with PUCCH association information, i.e. PUCCH reference cell configuration information. If so, then execute Step 805a, or else execute Step 805b.

Step 805a: The UE transmits the UCI of the SCell on a PUCCH of a configured reference cell.

Step 805b: The UE transmits the UCI of the SCell on a PUCCH of a PCell.

Step 805c: The UE transmits the UCI of the serving cell on a PUCCH of a local cell.

Among the above-mentioned steps, Step 802 is optional. That is, the UE can transmit UCI of the PCell on the PUCCH of the PCell by default without carrying out determination. After the UE triggers the reporting of the UCI of the SCell in Step 801, Step 803 is executed directly.

In addition, when the content of PUCCHCellId-r13 can be set as a PCell or an SCell, Step 804 can be omitted. That is, when the result of executing Step 803 is No, jump to execute Step 805a. Naturally, Step 805b can also be omitted, because Step 805b and Step 805a can represent the same content at this point.

In addition, the case that the content of PUCCHCellId-r13 can be set as a PCell or an SCell includes the following two types: (1) SerCellIndex can be used to mark a serving cell (not only a PCell but also an SCell can be marked), for example, a PCell is marked when SerCellIndex is 0, and an SCell is marked when SerCellIndex is 1 to m (m is a natural number); (2) in the information element of the present embodiment, PUCCHCellId-r13 can also be the following form:

```
PUCCHassociation-r13        CHOICE {
    SCellIndex,
    PCell
}
```

SCellIndex is used to mark a secondary cell, and it can be replaced by other forms of cell identities for representing a secondary cell.

Embodiment 7

The present embodiment provides a method for a UE to transmit UCI of a serving cell on PUCCH of the corresponding reference cell according to PUCCH reference cell configuration information of the serving cell configured by an eNB.

In the present embodiment, a method for configuring PUCCH reference cell configuration information of serving cells is as follows:

```
RadioResourceConfigCommonSCell-r10 ::= SEQUENCE {
    ...,
    OMIT THE UNCHANGE PART
    ...,
    [[
        pucch-ConfigCommon-r13        PUCCH-ConfigCommon,    OPTIONAL -- Need OP
    ]],
}
}
RRCConnectionReconfiguration-v13xy-IEs ::= SEQUENCE {
    pucchGroup-ToReleaseList-r13          pucchGroup-ToReleaseList-r13 OPTIONAL,    -- Need ON
    pucchGroup-ToAddModList-r13           pucchGroup-ToAddModList-r13 OPTIONAL,     -- Need ON
    nonCriticalExtension                  RRCConnectionReconfiguration-v13xy-IEs OPTIONAL
}
pucchGroup-ToReleaseList-r11 ::=SEQUENCE (SIZE (1..maxpucchGroup-r13)) OF pucchGroup-r13
pucchGroup-ToAddModList-r11 ::= SEQUENCE (SIZE (1..maxpucchGroup-r13)) OF pucchGroup-r13
pucchGroup-ToAddMod-r11 ::=   SEQUENCE {
    pucchGroup-Id                 SerCellIndex-r13,
    SCellList ::=     SEQUENCE (Size (1..maxSCell)) OF SCellIndex-r13
    ...
}
```

PUCCHs of serving cells or SCells can be configured through PUCCH-ConfigCommon information elements, and PUCCH reference cell configuration information of the serving cells or SCells can be configured through PUCCH group association information elements. In addition, SerCellIndex and SCellIdex are used to mark a secondary cell, and they can be replaced by other forms of cell identities for representing a secondary cell.

Figure 9:
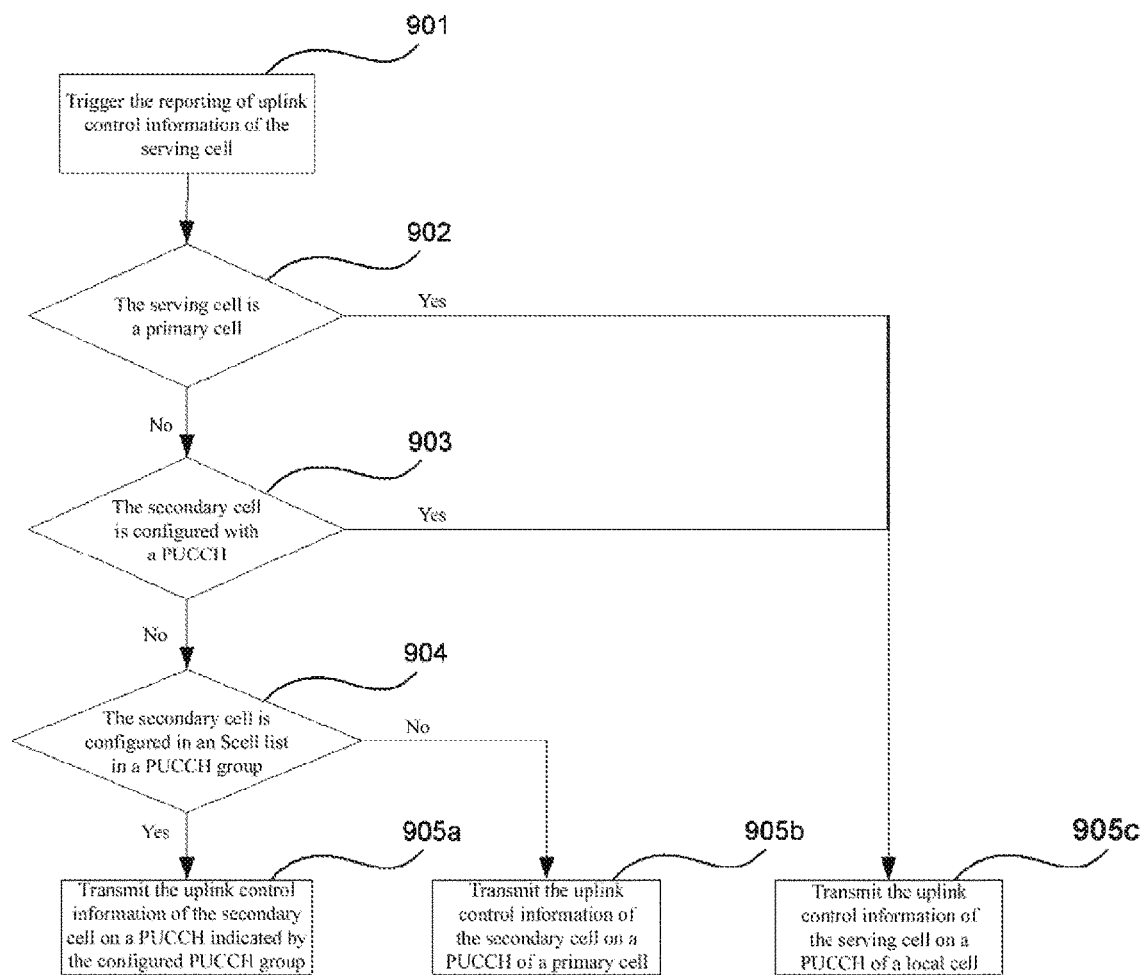
FIG. 9 is a flowchart of a method executed by a UE according to one embodiment of the present invention.

FIG. 9 is a flowchart of a method executed by a UE according to one embodiment of the present invention.

Step 901: The UE triggers the reporting of UCI of one or more serving cells.

Step 902: The UE determines whether the serving cell is a PCell. If so, then execute Step 905c, or else execute Step 903.

Step 903: The UE determines whether the SCell is configured with a PUCCH. If so, then execute Step 905c, or else execute Step 904.

Step 904: The UE determines whether the SCell is configured in an SCell list in a PUCCH group. If so, then execute Step 905a, or else execute Step 905b.

Step 905a: The UE transmits the UCI of the SCell on a PUCCH of a configured reference cell.

Step 905b: The UE transmits the UCI of the SCell on a PUCCH of a PCell.

Step 905c: The UE transmits the UCI of the serving cell on a PUCCH of a local cell.

Among the above-mentioned steps, Step 902 is optional. That is, the UE can transmit UCI of the PCell on the PUCCH of the PCell by default without carrying out determination. After the UE triggers the reporting of the UCI of the SCell in Step 901, Step 903 is executed directly.

In addition, when the content of PUCCHgroupId can be set as a PCell or an SCell, Step 904 can be omitted, that is, when the result of executing Step 903 is No, jump to execute Step 905a. Naturally, Step 905b can also be omitted, because Step 905b and Step 905a can represent the same content at this point.

In addition, the case that the content of PUCCHgroupId can be set as a PCell or an SCell includes the following two types: (1) SerCellIndex can be used to mark a serving cell (not only a PCell but also an SCell can be marked), for example, a PCell is marked when SerCellIndex is 0, and an SCell is marked when SerCellIndex is 1 to m (m is a natural number); (2) in the information element of the present embodiment, PUCCHgroupId can also be the following form:

```
PUCCHgroupId-r13        CHOICE {
    SCellIndex,
    PCell
}
```

SCellIndex is used to mark a secondary cell, and it can be replaced by other forms of cell identities for representing a secondary cell.

Embodiment 8

Figure 10:
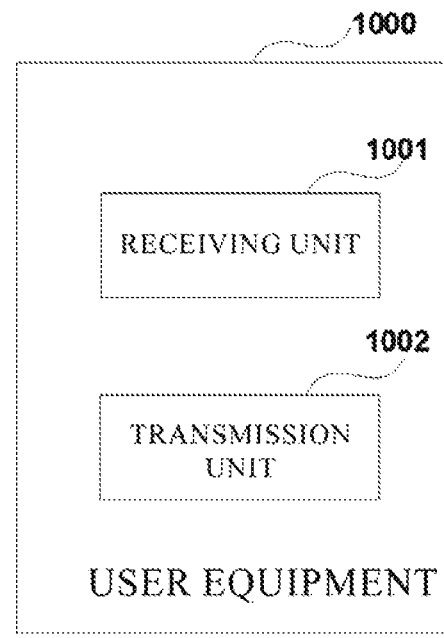
FIG. 10 is a block diagram of a UE according to one embodiment of the present invention.

FIG. 10 is a block diagram of a UE according to one embodiment of the present invention. The present embodiment provides a structural block diagram of a UE device for transmitting UCI of a serving cell on PUCCH of corresponding reference cells according to PUCCH reference cell configuration information of the serving cell configured by an eNB.

As illustrated in FIG. 10, the UE 1000 includes: a receiving unit 1001 configured to receive a configuration message from the base station, the configuration message includes PUCCH reference cell configuration information of the serving cells, where reference cells include a primary cell and/or secondary cells configured with PUCCHs, as described above.

As illustrated in FIG. 10, the UE 1000 also includes: a transmission unit 1002 configured to transmit uplink control information of the serving cells on the corresponding PUCCHs according to the PUCCH reference cell configuration information of the serving cells. For example, if a serving cell itselves is a reference cell, the transmission unit 1002 can transmit the uplink control information of the serving cell on the PUCCH of the serving cell. Or, if the serving cell is configured with a reference cell, the transmission unit 1002 can transmit the uplink control information of the serving cell on the PUCCH of the reference cell. In addition, if a serving cell is neither a reference cell nor configured with a reference cell, the transmission unit 1002 can transmit the uplink control information of the serving cell on the PUCCH of the primary cell.

In an example, the uplink control information can include one or more of the following: a channel quality indicator, a precoding matrix index, a rank indicator, a precoding type indicator, and hybrid automatic repeat request feedback.

In an example, the primary cell and the secondary cells can belong to the same base station. Alternatively, the secondary cells and the reference cells corresponding thereto can belong to the same base station.

In an example, the PUCCH reference cell configuration information of the serving cells is included in an RRC message.

Embodiment 9

Figure 11:
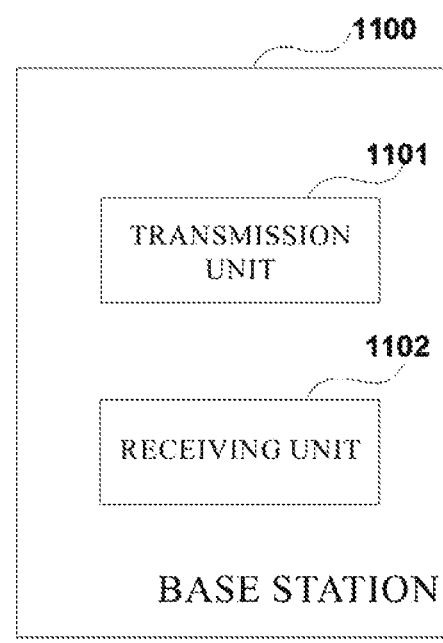
FIG. 11 is a block diagram of a base station according to one embodiment of the present invention.

FIG. 11 is a block diagram of a base station according to one embodiment of the present invention. As illustrated in FIG. 11, the base station 1100 includes a transmission unit 1101 and a receiving unit 1102.

The transmission unit 1101 is configured to transmit a configuration message to the user equipment, the configuration message includes PUCCH reference cell configuration information of serving cells, where reference cells include a primary cell and/or secondary cells configured with PUCCHs.

The receiving unit 1102 is configured to receive uplink control information of the serving cells on the corresponding PUCCHs according to the PUCCH reference cell configuration information of the serving cells. For example, if a serving cell itself is a reference cell, the receiving unit 1102 can receive the uplink control information of the serving cell on the PUCCH of the serving cell. Or, if a serving cell is configured with a reference cell, the receiving unit 1102 can receive the uplink control information of the serving cell on the PUCCH of the reference cells. In addition, if a serving cell is neither a reference cell nor configured with a reference cell, the receiving unit 1102 can receive the uplink control information of the serving cell on the PUCCH of the primary cell.

In an example, the uplink control information can include one or more of the following: a channel quality indicator, a precoding matrix index, a rank indicator, a precoding type indicator, and hybrid automatic repeat request feedback.

In an example, the primary cell and the secondary cells can belong to the same base station. Alternatively, the secondary cells and the reference cells corresponding thereto can belong to the same base station.

In an example, the PUCCH reference cell configuration information of the serving cells is included in an RRC message.

Note that when the present invention is applied in the DC scenario (that is, the UE is served by two eNBs at the same time), the PCell in each above-mentioned embodiment of the present invention can also refer to a PSCell.

It should be understood that the above-mentioned embodiments of the present invention can be implemented by software, hardware, or a combination of software and hardware. For example, the various components in the base station and the user equipment in the above-mentioned embodiments can be implemented by a variety of devices, and these devices include, but are not limited to: an analog circuit device, a digital circuit device, a digital signal processing (DSP) circuit, a programmable processor, an application-specific integrated circuit (ASIC), a field programmable gate array (FPGA), a complex programmable logic device (CPLD), and the like.

In the present application, the "base station" means a mobile communication data and control switching center with high transmitting power and wide coverage, and includes functions such as resource allocation and scheduling and data receiving and transmission. The "user equipment" means a user mobile terminal, such as terminal equipment capable of performing radio communication with base stations or micro base stations, including mobile phones and laptop computers.

The specific embodiments of the present invention are disclosed in detail above. It should be understood that features described and/or illustrated for one embodiment can be used in one or more other embodiments in the same or similar way to combine with the features in the other embodiments or substitute for the features in other embodiments.

It should be emphasized that the term "comprise/include" means the existence of the features, the steps or the components when used in this article, but does not exclude the existence or addition of one or more other features, steps or components.

In addition, the embodiments of the present invention disclosed herein can be implemented on a computer program product. More specifically, the computer program product is the following product: the product is provided with a computer-readable medium, a computer program logic is coded on the computer-readable medium, and when executed on a computing device, the computer program logic provides related operation to implement the above-mentioned technical solution of the present invention. When executed on at least one processor of the computing system, the computer program logic makes the processor execute the operation (method) described by the embodiments of the present invention. Such setting of the present invention is typically provided as software, codes and/or other data structures arranged or coded on computer-readable media, such as optical media (for example, CD-ROM), floppy discs or hard discs, or other media for firmware or microcodes on, for example, one or more ROM or RAM or PROM chips or downloadable software images, shared databases and the like in one or more modules. The software or the firmware or such configuration can be installed on a computing device, so that one or more processors in the computing device can execute the technical solution described in the embodiments of the present invention.

Although the present invention has been illustrated in reference to the preferred embodiments of the present invention, those skilled in the prior art shall understand that under the condition of not departing from the spirit and scope of the present invention, various modifications, replacements and changes can be made on the present invention. Therefore, the present invention should be limited by the attached claims and equivalents thereof rather than the above-mentioned embodiments.

The invention claimed is:

1. A method executed by a base station, comprising:
transmitting a physical uplink control channel (PUCCH) reference cell information for a SCell in an RRC Connection Reconfiguration message; and
receiving uplink control information of the SCell on a PUCCH SCell if the PUCCH reference cell information is configured for the SCell;
receiving uplink control information of the SCell on the SCell if the SCell is the PUCCH SCell;
receiving uplink control information of the SCell on a PCell or a PSCell, if the PUCCH reference cell information is absent for the SCell and the SCell is not a PUCCH SCell;
wherein, the PUCCH SCell is a SCell configured with PUCCH.

2. The method according to claim 1, wherein the uplink control information includes one or more of: a channel quality indicator, a precoding matrix index, a rank indicator, a precoding type indicator, and hybrid automatic repeat request feedback.

3. A method executed by a user equipment, comprising:
receiving a physical uplink control channel (PUCCH) reference cell information for a SCell in an RRCConnectionReconfiguration message; and
sending uplink control information of the SCell on a PUCCH SCell if the PUCCH reference cell information is configured for the SCell;
sending uplink control information of the SCell on the SCell if the SCell is the PUCCH SCell;
sending uplink control information of the SCell on a PCell or a PSCell, if the PUCCH reference cell information is absent for the SCell and the SCell is not a PUCCH SCell;
wherein, the PUCCH SCell is a SCell configured with PUCCH.

4. The method according to claim 1, wherein
the primary cell and the secondary cells belong to the same base station; and/or
the secondary cells and the reference cells corresponding thereto belong to the same base station.

5. The method according to claim 3, further comprising:
transferring, a capability information included in a UE-EUTRAN-Capability information element in UECapabilityInformation message to a eNB, wherein the capability information indicates whether the UE support PUCCH transmission on the PUCCH SCell;
wherein, the PUCCH SCell is a SCell configured with PUCCH.

6. The method according to claim 3, wherein the uplink control information includes one or more of: a channel quality indicator, a precoding matrix index, a rank indicator, a precoding type indicator, and hybrid automatic repeat request feedback.

7. The method according to claim 3, wherein
the primary cell and the secondary cells belong to the same base station; and/or
the secondary cells and the reference cells corresponding thereto belong to the same base station.

8. A base station, comprising:
a transmission unit, configured to transmit a physical uplink control channel (PUCCH) reference cell information for a SCell in an RRCConnectionReconfiguration message; and
a receiving unit, configured to receive uplink control information of the SCell on a PUCCH SCell if the PUCCH reference cell information is configured for the SCell; receive uplink control information of the SCell on the SCell if the SCell is the PUCCH SCell; receive uplink control information of the SCell on a PCell or a PSCell, if the PUCCH reference cell information is absent for the SCell and the SCell is not a PUCCH SCell;
wherein, the PUCCH SCell is a SCell configured with PUCCH.

9. The base station according to claim 8, wherein the uplink control information includes one or more of: a channel quality indicator, a precoding matrix index, a rank indicator, a precoding type indicator, and hybrid automatic repeat request feedback.

10. The base station according to claim 8, wherein
the primary cell and the secondary cells belong to the same base station; and/or
the secondary cells and the reference cells corresponding thereto belong to the same base station.

11. A user equipment, comprising:
a reception unit, configured to receive a physical uplink control channel (PUCCH) reference cell information for a SCell in an RRCConnectionReconfiguration message; and
a transmission unit, configured to send uplink control information of the SCell on a PUCCH SCell if the PUCCH reference cell information is configured for the SCell; send uplink control information of the SCell on the SCell if the SCell is the PUCCH SCell; send uplink control information of the SCell on a PCell or a PSCell, if the PUCCH reference cell information is absent for the SCell and the SCell is not a PUCCH SCell;
wherein, the PUCCH SCell is a SCell configured with PUCCH.

12. The user equipment according to claim 11, wherein the uplink control information includes one or more of: a channel quality indicator, a precoding matrix index, a rank indicator, a precoding type indicator, and hybrid automatic repeat request feedback.

13. The user equipment according to claim 11, wherein
the primary cell and the secondary cells belong to the same base station; and/or
the secondary cells and the reference cells corresponding thereto belong to the same base station.

14. The user equipment according to claim 11, wherein
the PUCCH reference cell configuration information of the serving cells is included in a radio resource control (RRC) message.

* * * * *